United States Patent [19]

Inoue et al.

[11] Patent Number: 4,525,029
[45] Date of Patent: Jun. 25, 1985

[54] REAR PROJECTION SCREEN

[75] Inventors: Masao Inoue; Shingo Suzuki, both of Tokyo; Hajime Gotoh, Nagoya, all of Japan

[73] Assignee: Mitsubishi Rayon Co., Ltd., Tokyo, Japan

[21] Appl. No.: 564,301

[22] Filed: Dec. 22, 1983

[30] Foreign Application Priority Data

Dec. 27, 1982 [JP] Japan ................................. 57-234409

[51] Int. Cl.³ ............................................ G03B 21/60
[52] U.S. Cl. ..................................................... 350/128
[58] Field of Search ................................. 350/127–129

[56] References Cited

U.S. PATENT DOCUMENTS

| | | | |
|---|---|---|---|
| 2,738,706 | 3/1956 | Thompson, Jr. | 350/129 X |
| 3,218,924 | 11/1965 | Miller | 350/129 |
| 3,523,717 | 8/1970 | Glenn, Jr. | 350/123 |
| 3,830,556 | 8/1974 | Bratkowski | 350/128 |
| 3,832,032 | 8/1974 | Shimada | 350/128 |
| 4,140,370 | 2/1979 | Snaper | 350/128 |
| 4,172,219 | 10/1979 | Deml et al. | 350/128 X |
| 4,298,246 | 11/1981 | Iwamura | 350/128 X |
| 4,432,608 | 2/1984 | Grup | 350/128 |
| 4,468,092 | 8/1984 | Inoue et al. | 350/128 |

Primary Examiner—Richard A. Wintercorn
Attorney, Agent, or Firm—Brumbaugh, Graves, Donohue & Raymond

[57] ABSTRACT

In the embodiments of the invention disclosed herein a rear projection screen has a projection surface and a viewing surface with one of the surfaces formed so as to serve as a lens to provide bright stripe portions where the light passes and dark stripe portions where no light passes. Grooves are formed in the viewing surface along the dark stripe portions and thread-like members are disposed in these grooves as light-absorbing means. The lens formed in the screen surface may be formed of lenticules grooves having total reflection surfaces provided on both sides thereof and a Fresnel lens may be provided on the projection side surface. The thread-like members may be self-adhesive and may be disposed under tension in a screen having a curved surface. A diffusion agent and/or a light-absorbing colorant may be mixed into a medium constituting the screen.

15 Claims, 17 Drawing Figures

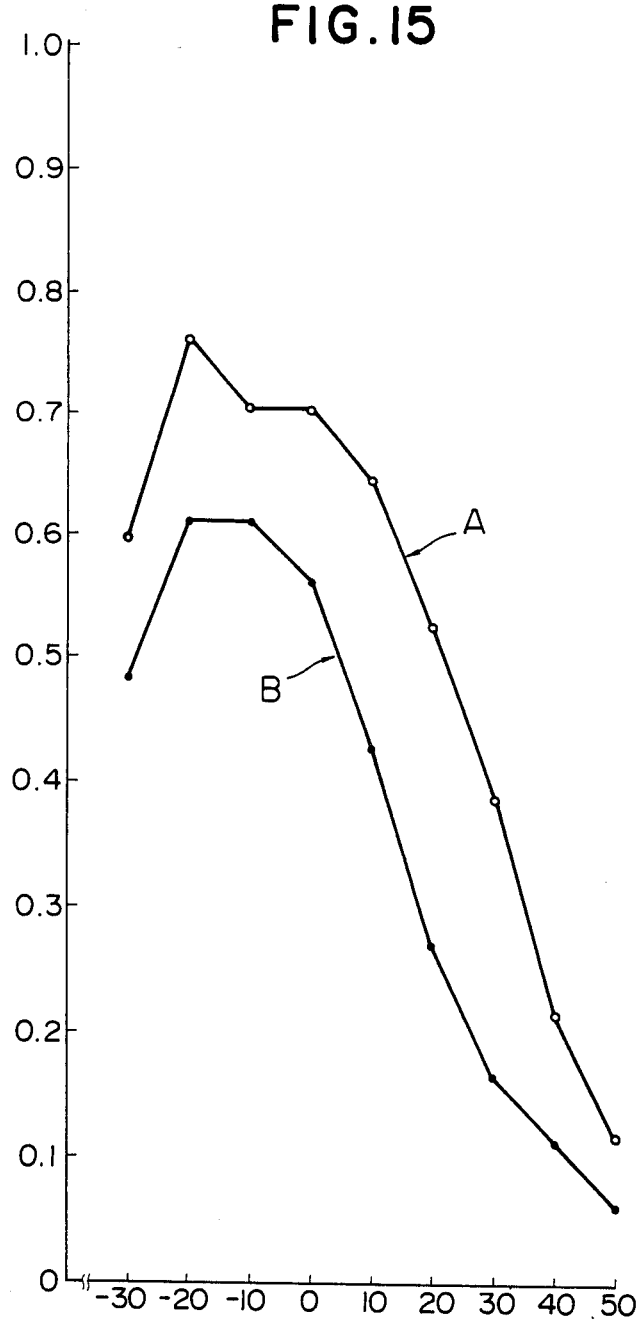

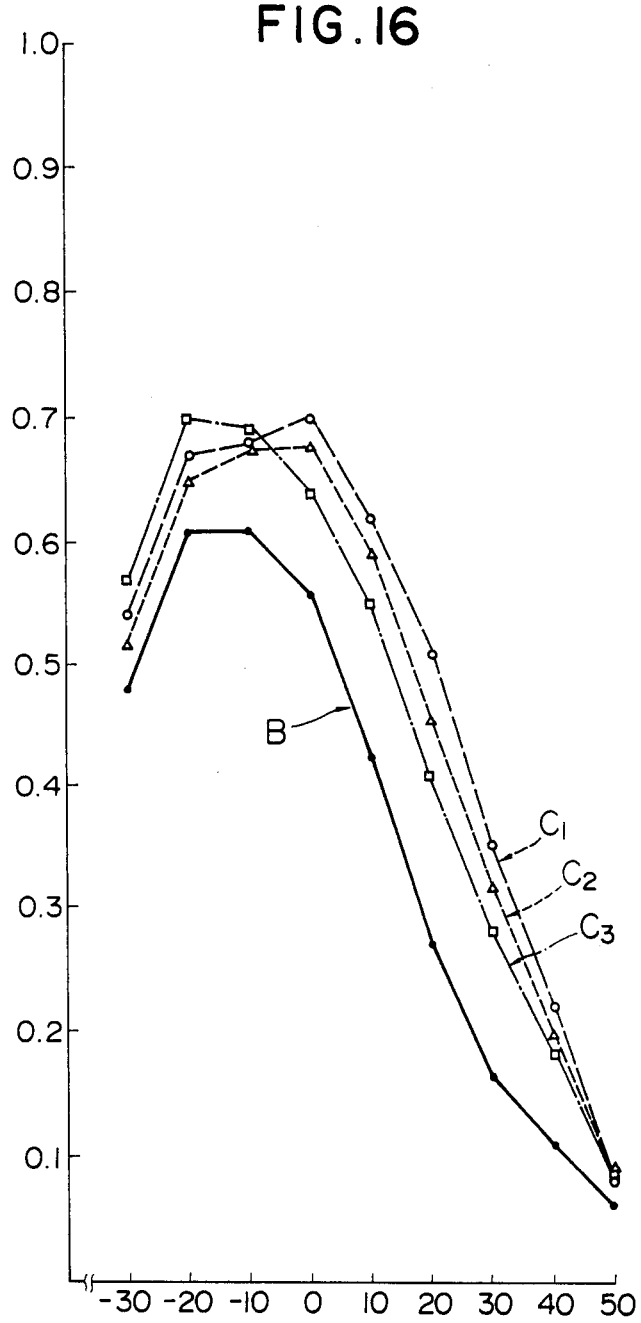

REAR PROJECTION SCREEN

BACKGROUND OF THE INVENTION

The present invention relates to rear projection screens and, more particularly, to a new and improved rear projection screen providing increased image contrast.

Various types of rear projection screens for television systems and the like have been proposed, and some of them have already been put into practical use. Rear projection screens for television systems providing a large image are employed mainly to permit a large number of viewers to view the screen at the same time. For this purpose, it is necessary to employ a screen having a greater than normal angular field of vision. Accordingly, a lenticular screen is preferably employed.

A lenticular screen is formed by arranging on at least one surface thereof a multiplicity of elongated lenses of cylindrical shape, for example, with their longitudinal axes placed substantially parallel to each other. In rear projection television systems the lenticular screen is arranged so that the light rays from the projector of a television system tube are received on the side facing the projector, then refracted and condensed by the elongated lenses are thereafter diffused so as to emanate in a specific angular range from the viewing side of the screen. Since the lenticular screen has a multiplicity of elongated lenses arranged on at least one of its surfaces, the front surface of the screen has elongated bright portions where the light is allowed to pass by the refractive condenser effect of the elongated lenses, spaced by dark portions where no light passes. More specifically, the lenticular screen produces on its front surface a multiplicity of parallel bright stripe portions and dark stripe portions. Generally speaking, a rear projection screen having one lenticular surface has on its viewing side surface bright portions where light is transmitted and dark portions where no light is transmitted.

It is preferable that a television projection screen should be visible in a "bright room" having a substantial level of ambient light. If ambient light is incident on an image portion of the television projection screen, however, the dark portion, or black portions, of an image is illuminated, reducing the image contrast.

The image contrast of a television projection screen is generally defined as follows:

$$\text{contrast } C = \frac{B_{MAX} + B_1}{B_{MIN} + B_2}$$

where $B_{MAX}$ is the brightness of the bright region of image; $B_{MIN}$ is the brightness of the dark region of image; $B_1$ is the brightness of reflected ambient light at the bright image region; and $B_2$ is the brightness of reflected ambient light at the dark image region.

In a dark room having no ambient light, the higher the ratio, $B_{MAX}/B_{MIN}$, the higher is the apparent image contrast. In a bright room having substantial ambient light, however, the brightnesses ($B_1$, $B_2$) of reflected ambient light must be taken into consideration.

More specifically, in order to increase the image contrast on the television projection screen, it is necessary to keep the brightness of the reflected ambient light at the light and dark image regions as low as possible. To accomplish this at a given level of ambient light, the amount of ambient light absorbed by the television projection screen must be increased. For this purpose, light absorbing elements must be provided on the surface of the screen.

Techniques for providing light absorbing elements on a screen are proposed, for example, in U.S. Pat. Nos. 3,523,717, 3,830,556 and 4,172,219 as well as Japanese Patent Publication No. 46693/77. These patents disclose rear projection screens having a lenticular lens formed on one surface by a multiplicity of cylindrical lenticules and also having shading stripes on the portions of the opposite screen surface in the regions where no light passes in order to increase the image contrast.

In the television projection screen shown in the specification of Japanese Patent Publication No. 46693/77, for example, a photoresist film is coated on the surface of the lenticular screen opposite to the surface provided with the lenticular lens. The photoresist film is exposed, developed and dried to form such a stripe pattern where the exposed portions of the film are left on the surface. These film stripes are located in the region where no light is transmitted by the lenticular surface, and an oil ink is applied to the stripe pattern by offset printing or the like to form light absorbing stripes.

To provide a stripe pattern with oil ink as described above, however, requires a very high level of printing technology and complicated processing is required because the stripes of the stripe pattern are exceedingly fine and accurate positioning is necessary during application of the ink. Moreover, it is necessary to expose, develop and dry the photoresist film, therefore requiring that the manufacture of the television projection screen be carried out in a darkroom. In addition, since the photoresist film has poor adhesion, the processing must be carried out with exceptional care. Accordingly, the manufacturing cost of such screens inevitably increases.

Moreover, the photoresist film method requires that ink be printed or applied directly onto the portions of the television projection screen where no light passes. By such application, however, unevenness of printing is easily produced, and it is difficult to effect a striping which is very narrow and uniform in width as mentioned above.

SUMMARY OF THE INVENTION

Accordingly, an object of the invention is to provide a rear projection screen suitable for television projection systems having high image contrast in ambient light which is easy to manufacture as well as low in cost, thereby overcoming the above-described problems of conventional television projection screens.

In accordance with the invention, a rear projection screen having a lenticular surface providing a multiplicity of bright stripe portions where the light passes and dark stripe portions where no light passes is formed with elongated grooves along the dark stripe portions of the viewing surface and thread-like members are disposed as light absorbing means in the elongated grooves.

A rear projection screen in accordance with the invention can be made from conventional materials such as acrylic resins, vinyl chloride resins, polycarbonate resins, olefin resins, styrene resins and so forth. With these synthetic resins, the rear projection screen of the invention can be produced by extrusion, compression molding, injection molding and the like. In this way, the above-mentioned multiplicity of elongated grooves in the viewing surface of the rear projection screen can easily be formed simultaneously with the formation of the lenticular surface. Moreover, the thread-like members can easily be inserted in the multiplicity of elongated grooves, by supplying them at a spacing equal to that of the elongated grooves.

It should also be noted that a diffusion agent may be added to the material from which the screen is made to increase the diffusion of light in both the vertical and horizontal directions in the rear projection screen of the invention. Examples of such diffusion agents include $SiO_2$, $Al_2O_3$, $Al(OH)_3$, $BaSO_4$, $TiO_2$, $CaCO_3$. In addition, it is possible to control the brightness of the rear projection screen by adding to the material from which the screen is made a light absorbing colorant, such as carbon black, aniline black and so forth, alone or together with a diffusion agent of the type mentioned above. Since an addition of a large amount of such a light absorbing colorant lowers the light transmittance of the rear projection screen, however, it is desirable to restrict the amount to about 10 to 20 ppm so that the total transmittance of light by the screen will not be lower than 60%.

BRIEF DESCRIPTION OF THE DRAWINGS

The present invention will be more readily understood from the following description of preferred embodiments thereof with reference to the accompanying drawings, in which:

FIGS. 15 and 16 are graphical representations showing the results of tests demonstrating the effects of the invention.

DETAILED DESCRIPTION OF THE PREFERRED EMBODIMENTS

Figure 1:
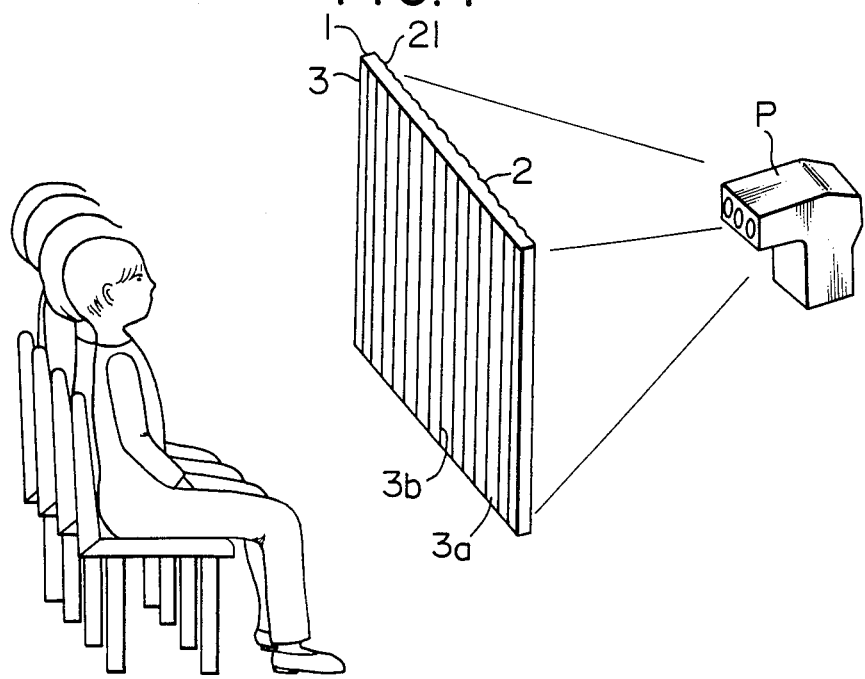
FIG. 1 is a schematic perspective view showing a television projection system employing a rear projection screen in accordance with the invention.

Referring first to FIG. 1, which schematically illustrates a television projection system, light rays diverging from a projector P impinge on a projection surface 2 of a rear projection screen 1. The projection surface 2 is a lenticular lens comprising a multiplicity of elongated lenses 21 with their longitudinal axes extending vertically. The light rays from the projector are refractively condensed by the elongated lenses 21 and emanate from a viewing surface 3 of the screen within a predetermined angular range while being uniformly diffused. The refractive condensing function of the elongated lenses 21 produces on the viewing surface 3 alternate parallel vertical bright stripe portions 3a where light passes and vertical dark stripe portions 3b where no light passes.

To increase the image contrast, the dark stripe portions 3b are arranged in accordance with the invention to be light-absorbing shading portions. In one embodiment, as illustrated in detail in FIG. 3, elongated grooves 31 are formed in the viewing surface 3 of the rear projection screen 1 along the portions corresponding to the dark stripe portions 3a. In addition, a thread-like member 32 is disposed in each of the grooves 31.

Figure 4A:
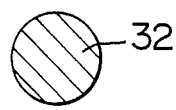
FIGS. 4A and 4B are enlarged cross-sectional views showing thread-like members employed in the screen of the invention.

The thread-like member 32 employed in the invention may be made from any material which has a light-absorbing capacity and sufficient strength. As shown in FIG. 4A, a suitable material for the thread-like member 32 is, for example, a spun yarn or filament yarn of natural or synthetic fiber that is dyed with a dark color. It is also possible to employ a yarn of a metallic fiber, such as aluminum and the like, or a very thin metallic filament, such as music wire and the like.

In this way light-absorbing shading portions can be accurately provided at predetermined positions with a constant and uniform width simply by arranging the thread-like members 32 as light-absorbing means in the respective elongated grooves 31 formed in the viewing surface 3 of the rear projection screen 1. In addition, unlike conventional rear projection screens, there is no need for printing or applying light-absorbing shading portions. Consequently, it is possible to omit the complicated process required to provide such shading portions.

Figure 4B:
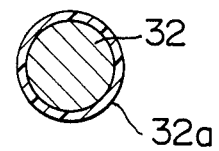

The thread-like members 32 are preferably secured in their respective grooves 31 by means of adhesive. For this purpose, the thread-like member may be impregnated with an adhesive or provided with an adhesive layer 32a as shown in FIG. 4B. Moreover, it is not always necessary to effect the bonding of the thread-like member 32 to the groove 31 throughout the entire length of the groove 31, and it will suffice to effect a partial bonding at proper locations. Examples of suitable adhesives for this purpose include vinyl acetate, acrylic and urethane adhesives. However, it is also possible to employ so-called hot-melt adhesives. Examples of suitable hot-melt adhesives are polyamide, butyl rubber, olefin, and ethylene-vinyl acetate (EVA) adhesives. An EVA adhesive is particularly preferable, since it permits bonding at a temperature lower than 100° C. and has a good transparency.

As described above, light-absorbing shading portions of constant and uniform width can be accurately positioned simply by arranging the light-absorbing thread-like members 32 as light-absorbing means in the respective elongated grooves 31 formed in the viewing surface 3 of the rear projection screen 1 through the utilization of the adhesion of the light-absorbing thread-like members 32. This assures that the light-absorbing shading portions are firmly positioned without any possibility of displacement. Consequently, there is no need for printing or coating to provide light-absorbing shading portions and the complicated process required therefor is unnecessary.

Figure 2:
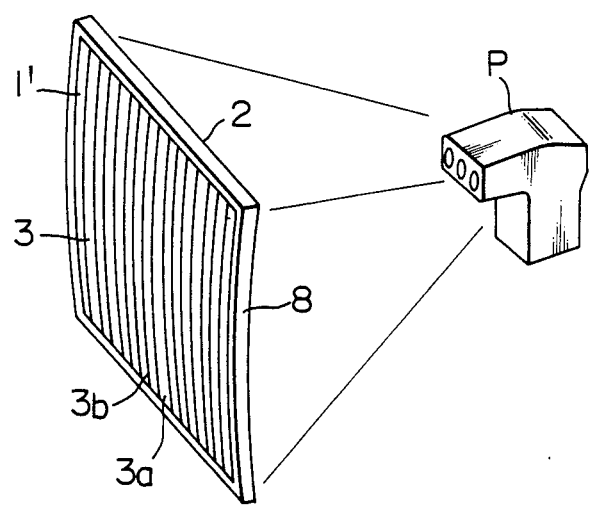
FIG. 2 is a schematic perspective view showing a television projection system employing another rear projection screen in accordance with the invention.

On the other hand, a rear projection screen is especially effective if the thread-like members 32 have no adhesive. In this case, shown in FIGS. 2 and 3, the thread-like members 32 are arranged under tension, and the rear projection screen 1' is formed with a curved surface. Thus, the thread-like members 32 are positioned under tension in the grooves 31 along the curved surface of the rear projection screen. As a result, the central portion of each thread-like member 32 is subjected to a force directed inwardly at the center of the curved surface of the screen thereby pressing the thread-like member 32 into the corresponding groove of the screen. Accordingly, the thread-like members 32 can be reliably secured in the grooves 31 without the need for adhesive or the like. In this case, it is, of course, possible to employ adhesive thread-like members to secure them more reliably in the grooves. The radius of curvature of the curved screen surface is preferably about 2 to 12 m. In addition, a frame 8 shown in FIG. 2 may be provided to maintain the rear projection screen in a curved configuration.

Figure 5:
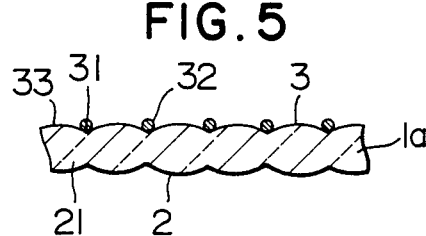
FIGS. 5 to 7 are fragmentary sectional views illustrating portions of other embodiments of the rear projection screen in accordance with the invention, respectively.

FIG. 5 illustrates another embodiment of the invention. In this embodiment lenticular lenses are formed on both surfaces of the rear projection screen 1a, and a thread-like member 32 is provided between adjacent elongated lenticules 33 on the viewing surface 3.

Figure 3:
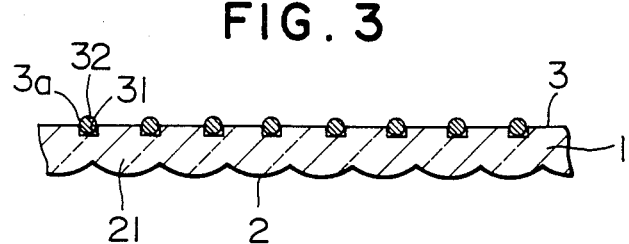
FIG. 3 is a fragmentary sectional view illustrating a portion of a typical embodiment of a rear projection screen in accordance with the invention.
Figure 6:
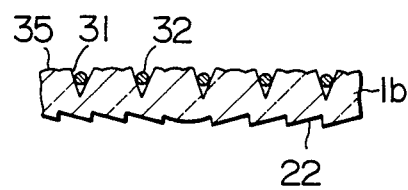
Figure 7:
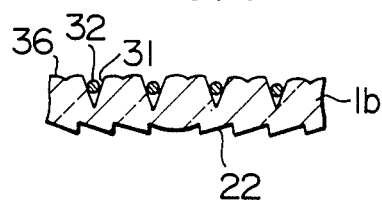

FIGS. 6 and 7 show further embodiments in which a rear projection screen 1b has a lenticular lens formed on the viewing surface 3 by a plurality of elongated lenticules 35, 36 different in shape from those shown in FIGS. 3 and 5. These lenticules 35, 36 have total reflection surfaces provided on the inclined surfaces on both sides of each lenticule. The inclined surfaces prevent any light from being transmitted there through toward the viewer thereby providing dark stripe portions. Rear projection screens having this structure are disclosed in the U.S. patent application Ser. No. 467,509 of Inoue et al. filed Feb. 18, 1983, and Ser. No. 364,193 of Yata et al, filed Mar. 31, 1982, now U.S. Pat. No. 4,418,986, both assigned to the assignee of the present application, and the description thereof is incorporated herein by reference. It should also be noted that the rear projection screens shown in FIGS. 6 and 7, respectively, have a Fresnel lens formed in the surface 2 facing the television projector. Since the Fresnel lens 22 functions to refract the light rays impinging on the projection surface 2 into parallel light rays and to converge the same on a predetermined portion of the viewing surface of the screen, the Fresnel lens 22 is effective in making the screen uniform in brightness. In this case, the focal length f of the Fresnel lens 22 is preferably selected to fall between 1.0 and 1.2 m, for example, when the rear projection screen is employed for a large-size television projector.

Figure 8:
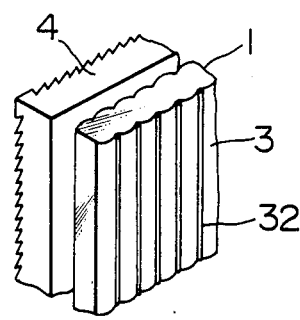
FIG. 8 is a fragmentary perspective view showing a portion of a rear projection screen formed by combining the embodiment shown in FIG. 5 with a Fresnel lens sheet as a separate body.

A still further embodiment, shown in FIG. 8, is arranged so that a separate Fresnel lens sheet 4 is disposed on the surface 2 of the rear projection screen shown in FIG. 5.

Figure 10:
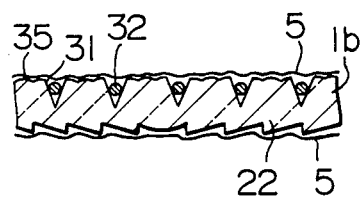
FIG. 10 is a fragmentary sectional view illustrating a portion of a rear projection screen of the invention provided with a light-transmitting film.

FIG. 10 shows still another embodiment of the invention in which light-transmitting films 5 are bonded to both the surfaces of the rear projection screen shown in FIG. 6. The light-transmitting films 5 function to prevent removal of the thread-like members 32 disposed on the viewing surface 3 and to protect both surfaces. If desired, the light-transmitting film 5 may be bonded to only the viewing surface 3. If light-transmitting films 5 are bonded to both surfaces as shown in FIG. 10, a shrinkable film made of polyester, polypropylene, polyvinyl chloride or the like may be employed to wrap the whole screen.

Figure 11:
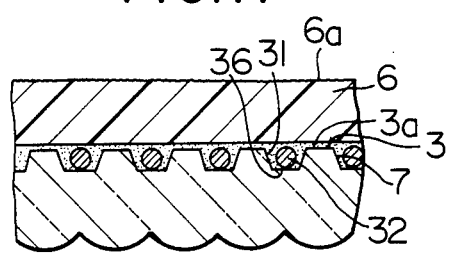
FIG. 11 is a fragmentary sectional view of a portion of a rear projection screen according to the invention provided with a light-transmitting resin layer.

FIG. 11 shows a still further embodiment in which a light-transmitting resin sheet 6 is bonded to the viewing surface of the rear projection screen shown in FIG. 3 by means of an adhesive 7. This embodiment is effective when the lenticular lens is formed only on the projection surface, as in the case of FIG. 3. The light-transmitting resin sheet 6 permits the thread-like members 32 to be sealed within the screen. In the embodiment shown in FIG. 11, a slightly rough surface 6a is provided on the viewing side of the light-transmitting resin sheet 6 to effect scattering of the light transmitted by the screen. For this purpose, a so-called matte film may be used as the light-transmitting film 5 on the viewing surface in the embodiment shown in FIG. 10. In addition, the light-transmitting film 5 and light-transmitting resin sheet 6 preferably include a diffusion agent and/or a light-absorbing colorant similar to those mentioned above.

Figure 12:
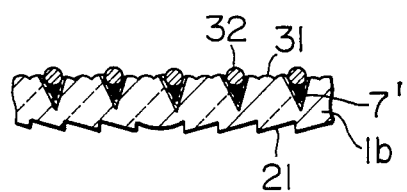
FIG. 12 is a fragmentary sectional view of a portion of a rear projection screen according to the invention with a layer of a substance having a small refractive index.
Figure 13:
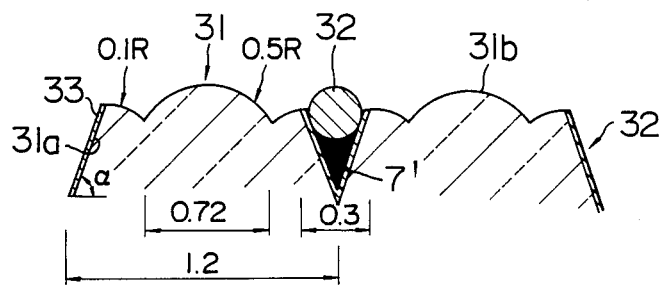
FIG. 13 is an enlarged sectional view of a portion of the rear projection screen shown in FIG. 12.

Still further embodiments shown in FIGS. 12 and 13 pertain to improvements in which the thread-like members 32 are inserted into grooves having total reflection surfaces as shown in FIG. 6. More specifically, each of the lenticular lens has total reflection surfaces 31a formed on both sides of the grooves so that the light rays impinging on the total reflection surfaces 31a are totally reflected once and then pass outwardly through an adjacent lens surface 31b having a larger radius. If a lenticular lens of the type shown in FIG. 6 is made from an acrylic resin having a refractive index of 1.492, for example, the angle of inclination of the total reflection surface 31a must be more than about 69°. The light rays impinging directly on the total reflection surface portion are totally reflected by the surface 31a and out of the lens surface 31b at the crest of the adjacent lenticule 31, in some cases at a large angle. With this arrangement, therefore, it is possible to provide a screen having a greater angular field of view.

Moreover, the groove 34 defined by the adjacent total reflection surfaces 31a constitutes a dark stripe where no light is transmitted. However, if a substance having a refractive index higher than that of the screen material, or a light-absorbing substance, is coated on the outer surface of the total reflection surface 31a, the light rays which would be totally reflected are transmitted or absorbed by the coating. Accordingly, in this embodiment, a layer 33 of a substance having a refractive index lower than that of the screen material is provided on the outer surface of the total reflecting surface 31a so that the total reflection function of the total reflection surface 31a will not be adversely affected at all even if an adhesive 7' for bonding the light-absorbing thread-like members 32 is attached thereto. The layer 33 is only required to have a refractive index no greater than 1.43 if the lenticular lens is made from an acrylic resin having a refractive index of 1.492 and having the dimensions (in mm.) shown in FIG. 13 and an angle $\alpha$ of 73.5°. Examples of a substance having such a refractive index are "Epo-Tek 394" (manufactured by Epoxy Technology Inc.; refractive index: 1.394), which is a silicone paint, and a fluorine paint formed by dissolving 2,2,3,3,3-pentafluoropropylmethacrylate (refractive index: 1.415) as the resin component in methyl ethyl ketone, methyl isobutyl ketone, ethyl acetate or the like.

The adhesive 7' must be able to bond the light-absorbing thread-like member 34 and the layer 33. If the above-mentioned silicone paint is employed as the layer 33, it is preferable to employ as the adhesive 7' an epoxy adhesive or "Epo-Tek VA-6" also manufactured by Epoxy Technology Inc. On the other hand, if a fluorine paint is employed as the layer 33, it is possible to use a vinyl acetate, acrylic or urethane solvent type adhesive. A hot-melt adhesive can also be employed in appropriate circumstances.

In the embodiments shown in FIGS. 12 and 13, a thread-like member 32 having the adhesive layer 32a as shown in FIG. 4B may be employed in place of the adhesive 7 and a transparent adhesive having a refractive index lower than that of the medium may be employed as the adhesive for the layer 32a, if desired.

Example 1

Figure 9:
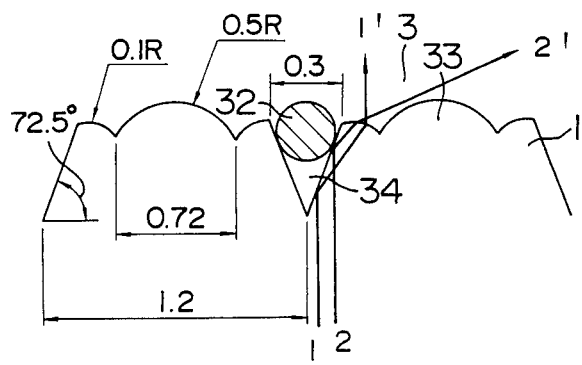
FIG. 9 is an enlarged fragmentary sectional view of a portion of the rear projection screen shown in FIG. 6.

A rear projection screen 1 provided with a lenticular lens of the type shown in FIG. 6 was formed from an acrylic resin sheet (thickness: 3 mm) with an additive of $SiO_2$ having an average particle diameter of 4 $\mu$ at a concentration of 23 g/cm² by compression molding (temperature: 180° C.; pressure: 40 kg/cm²). The construction of each of the lenticules comprising the lenticular lens of this rear projection screen 1 is illustrated in FIG. 9 in detail.

As the thread-like members 32, a black-dyed nylon fishing line having a diameter of 0.235 mm was employed and was arranged in a manner similar to that for a warpers beam and then warped. The warped lines were then expanded through a guide jig having guides disposed at a pitch of 1.2 mm, corresponding to the width of each dark stripe, and both ends of the lines were fixed. In this condition, the lines were pressed against the viewing surface of the screen so as to be received in the grooves in the dark stripe portions, and the upper and lower portions of the lines were secured to the upper and lower ends of the screen for 10 cm each by bonding using an epoxy adhesive.

Figure 14:
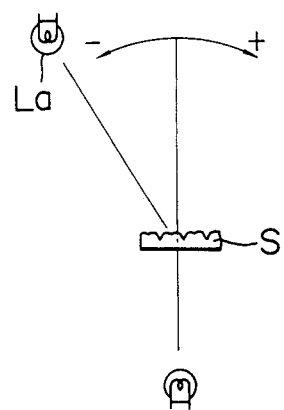
FIG. 14 is a schematic diagram illustrating a testing device employed for exhibiting effects of the invention.

Using a sample prepared by the above method, the contrast of the sample was evaluated by employing a testing device schematically shown in FIG. 14 and applying an ambient light to the sample from a light source La at an angle of 45 degrees with respect to the normal of the sample so that the illuminance on the viewing surface 3 of the rear projection screen 1 is 500 lux. In this condition, the image contrast was measured with and without ambient light, and the reduction in contrast resulting from ambient light was defined by taking the ratio therebetween.

More specifically, representing the contrast with no ambient light by $C_0$ and the contrast with ambient light by $C_1$, the rate of reduction in contrast resulting from ambient light was obtained from the following formula:

$$\text{reduction rate} = \frac{C_1}{C_0} = \left( \frac{\frac{B_{max} + B_1}{B_{min} + B_2}}{\frac{B_{max}}{B_{min}}} \right)$$

In this case, the value of $C_0$, measured when there was no ambient light, was set to be 45 to regulate the brightness ratio between $B_{max}$ and $B_{min}$. Although the contrast reduction rate is not specific to the sample alone since the reduction rate differs according to the value of $C_0$, it is possible to employ the reduction rate as a standard for judging the effect by ambient light if $C_0$ is maintained constant. Accordingly, as the reduction rate is larger and closer to 1, the reduction in contrast due to ambient light is smaller. The reduction rate was measured at 10 degree intervals from the ambient light side and the results are shown in FIG. 15.

It is understood from FIG. 15 that the contrast reduction rate is greatly improved in a screen having thread-like members 32, represented by the curve A, as compared with a screen having no thread-like members are provided, represented by the curve B.

The gain, i.e., the brightness measured under illumination with a unit illuminance, may be expressed as follows:

$$G = \frac{\text{foot} - \text{Lambert}}{\text{foot} - \text{Candle}}$$

Using the value $G_0$ to represent the maximum gain, i.e. the gain at a viewing angle of 0°, it is to be noted that, although the value $G_0$ in the case where no thread-like members 32 are provided is 5.2, the value $G_0$ in the case where the thread-like members 32 are provided is somewhat lower, i.e., 4.8.

FIG. 16, which is a graph similar to that of FIG. 15, shows the contrast reduction rate for a screen in which the thread-like members 32 are black cotton yarns having diameters of 1.25 mm ($C_1$), 0.2 mm ($C_2$) and 0.18 mm ($C_3$), respectively.

It is apparent from FIG. 16 that the contrast reduction rate is greatly improved by employing such black yarns and that the larger the yarn diameter, the higher the contrast. In this case, the value $G_0$ where no thread-like members are provided is 5.2, and the value $G_0$ where the black yarns are provided is also 5.2, i.e., there is no reduction in the value $G_0$.

Although the invention has been described in detail with respect to specific embodiments, it is to be understood that the described embodiments are not exclusive and that various changes and modifications may be made therein without departing from the scope of the invention which is limited solely by the appended claims.

What is claimed is:

1. A rear projection screen comprising a projection surface upon which light from a projector impinges and a viewing surface, at least one of the screen surfaces being formed so as to serve as a lens so that the light which impinges on the projection surface produces on the viewing surface a multiplicity of bright stripe portions where the light is transmitted and a multiplicity of dark stripe portions where no light is transmitted, a plurality of elongated grooves formed along the dark stripe portions of the viewing surface and a corresponding plurality of thread-like members disposed in the elongated grooves as light-absorbing means.

2. A rear projection screen according to claim 1, wherein said projection surface is provided with a lenticular lens means so as to serve as a lens.

3. A rear projection screen according to claim 1, wherein said viewing surface is provided with a lenticular lens means so as to serve as a lens.

4. A rear projection screen according to claim 3, wherein said lenticular lens means includes lenticules formed with total reflection surfaces provided on both sides of the elongated grooves.

5. A rear projection screen according to claim 4, wherein said total reflection surfaces are planar.

6. A rear projection screen according to claim 1, wherein a Fresnel lens is provided on said projection surface.

7. A rear projection screen according to claim 1, wherein both said projection surface and viewing surface are provided with lenticular lens means.

8. A rear projection screen according to claim 1, wherein said thread-like members are adhesive.

9. A rear projection screen according to claim 1, wherein the rear projection screen incorporates a diffusion agent.

10. A rear projection screen according to claim 1, wherein the rear projection screen incorporates a light absorbing colorant.

11. A rear projection screen according to claim 1, wherein said thread-like members are held under tension, and the surface of said screen in which the thread-like members are disposed is formed into a curved surface.

12. A rear projection screen comprising a projection surface upon which light from a projector impinges and a viewing surface, the viewing surface being provided with a lenticular lens so as to serve as a lens so that light impinging on the projection surface produces a multiplicity of brights stripe portions where the light is transmitted and a multiplicity of dark stripe portions where no light is transmitted, a plurality of grooves formed in the lenticular lens, each groove being formed with inclined total reflection surfaces on both sides, each total reflection surface being provided with a layer of a substance having a refractive index lower than that of a medium constituting said rear projection screen, and a thread-like member bonded in each groove as a light-absorbing means.

13. A rear projection screen according to claim 12, wherein a Fresnel lens is provided on said projection surface.

14. A rear projection screen according to claim 12 or claim 13, wherein the rear projection screen incorporates a diffusion agent.

15. A rear projection screen according to claim 12 or claim 13, wherein the rear projection screen incorporates a colorant.

* * * * *